F. G. TEES.
Power-Driven Device for Sewing-Machine.
No. 213,710. Patented Mar. 25, 1879.
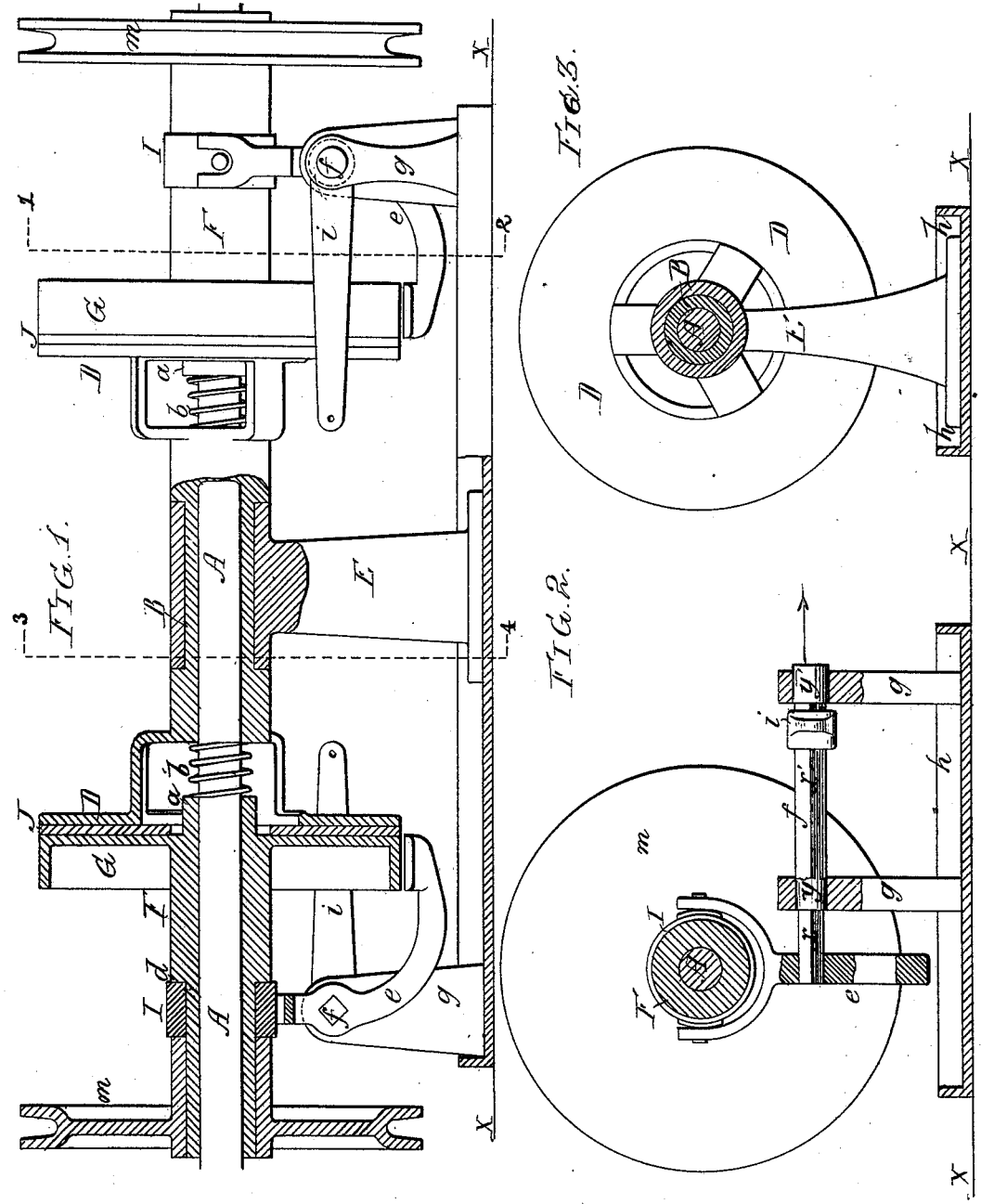
Witnesses,
Harry Smith
Inventor,
Frederick G. Tees
by his Attorneys
Howson & Son

UNITED STATES PATENT OFFICE.

FREDERICK G. TEES, OF PHILADELPHIA, PENNSYLVANIA, ASSIGNOR TO LEOPOLD STERNBERGER, OF SAME PLACE.

IMPROVEMENT IN POWER-DRIVEN DEVICES FOR SEWING-MACHINES.

Specification forming part of Letters Patent No. 213,710, dated March 25, 1879; application filed November 27, 1878.

*To all whom it may concern:*

Be it known that I, FREDERICK G. TEES, of Philadelphia, Pennsylvania, have invented a new and useful Improvement in Power-Driven Devices for Sewing-Machines, of which the following is a specification:

The object of my invention is to so construct clutching and braking devices for power-driven sewing-machines as to render the same compact and simple, to prevent the usual rapid wearing of the shaft, and to provide for the ready attachment of the parts to a suitable floor or support, so that they will bear their proper relation to each other.

These objects I attain in the manner which I will now proceed to describe, reference being had to the accompanying drawings, in which—

Figure is a side view, partly in section, of my improved clutching and braking arrangement for power-driven sewing-machines; Fig. 2, a transverse section on the line 1 2, Fig. 1; and Fig. 3, a transverse section on the line 3 4, Fig. 1.

A represents a portion of a long line of shafting extending along a room between two rows of sewing-machines, the shaft being arranged comparatively close to the floor X of the room, as shown. To this shaft is secured a sleeve, B, which carries at each end a ring, D, and is reduced in diameter at the center, for adaptation to a bearing formed in a standard, E.

Sliding loosely on the shaft A are two other sleeves, F, each of which carries a disk, G, the disk of one sleeve, F, being adjacent to the ring D at one end of the sleeve B, and the disk of the other sleeve, F, adjacent to the ring D at the opposite end of the sleeve B, a ring, J, of leather, cork, or other elastic or semi-elastic material, however, intervening between each disk G and the adjacent ring D.

Projecting from the faces of the disks G are central hubs, $a$, on which act springs $b$, coiled round the shaft A, and each bearing at one end against one end of the sleeve B, the tendency of these springs being to force the disks G away from the rings D. The hubs $a$ also serve to prevent the access of oil to the rings J, in a manner set forth in a separate application which I have made for a patent. Each of the sleeves F is reduced in diameter, so as to form a shoulder, $d$, against which bears a ring, I, which is adapted to the reduced portion of the sleeve, and is hung to a forked arm of a lever, $e$, carried by a rock-shaft, $f$, the other arm of the lever being bent and provided with a friction-plate, which, when the lever is properly operated, bears on the periphery of the adjacent disk G, so as to act as a brake.

The rock-shaft $f$ is adapted to bearings in the upper ends of two posts, $g$ $g$, which are rigidly secured to the plate or tray $h$, preferably, by being cast in one piece therewith.

The standard E is similarly secured to said tray $h$. Each of the rock-shafts $f$ has two square or angular portions, $x$ $x'$, and two round portions, $y$ $y'$, the portion $x$ being slightly less in size than the portion $x'$, and the portion $y$ less in diameter than the portion $y'$.

The lever $e$ is adapted to the portion $x$ of the shaft, and the end of the arm $i$ to the portion $x'$, and the round portion $y$ of the shaft has a bearing in one of the posts $g$, while the portion $y'$ has a bearing in the other post.

By this means provision is afforded for the lateral withdrawal of the shaft $f$ from its bearings in the direction of the arrow, Fig. 2, the lever $e$ and arm $i$ first being released from the shaft, so that the latter can be withdrawn from the same.

To the outer end of each sleeve F is secured the hub of a pulley, $m$, round which passes the belt which drives a sewing-machine, and to each of the rock-shafts $f$ is secured an arm, $i$, the outer end of one of these arms being attached to the treadle of a sewing-machine located on one side of the shaft A, while the end of the other arm $i$ is attached to the treadle of a sewing-machine located on the opposite side of said shaft.

The shaft A, sleeve B, and rings D revolve continuously, so that by depressing the end of either arm $i$ the disk G corresponding thereto will be moved toward the face of the adjacent ring D, and the motion of the latter transmitted, through the medium of the ring J, disk G, sleeve F, pulley $m$, and belt, to the driving-shaft of the sewing-machine.

As soon as the pressure is removed from the end of the arm $i$, the spring $b$ will force the disk G away from the ring D, so that frictional contact between the parts is no longer maintained, and the transmission of motion from one to the other ceases. The same movement also causes such an operation of the rock-shaft $f$ as will insure the application of the brake to the face of the disk G.

By securing a sleeve, B, to the shaft A, and adapting this sleeve to the bearing, all wear on the shaft due to the rotation of the same is prevented, and the shaft thus kept in working condition for a much longer time than usual, while at the same time the sleeve affords provision for the compact arrangement of parts.

The formation of the posts $g$ and standard E in one piece with the tray $h$ is also an advantageous feature of my invention, as it insures the proper relation to each other at all times of the bearings in said posts and standard, and provides a ready means of securing the said posts and standard to the floor or support. The tray, moreover, serves as a receptacle for collecting the oil which drips from the bearings above the same.

I claim as my invention—

1. The combination of the shaft A with the sleeve B, having a ring, D, the sleeve being secured to the shaft A, and surrounding the latter where it passes through the bearing E, as set forth.

2. The combination of the shaft A and bearing E with the sleeve B, secured to and surrounding the shaft A, adapted to the bearing E, and having at each end a ring, D, as set forth.

3. The combination of the tray $h$ with the posts $g$, forming a bearing for the rock-shaft $f$, and cast with or otherwise rigidly secured to the tray, as set forth.

4. The combination of the tray $h$ with the posts $g$ and standard E, cast with or otherwise rigidly secured to the tray, as specified.

5. The combination of the posts $g$, the lever $e$, and the arm $i$ with the rock-shaft $f$, having angular portions $x\ x'$ and bearing portions $y\ y'$, varying in size, so as to permit the lateral withdrawal of the shaft from the bearings, as specified.

In testimony whereof I have signed my name to this specification in the presence of two subscribing witnesses.

FREDERICK G. TEES.

Witnesses:
ALEX. PATTERSON,
HARRY SMITH.